United States Patent

Rendall et al.

[11] 4,303,620
[45] Dec. 1, 1981

[54] EXTRACTION PROCESS

[75] Inventors: John S. Rendall, Stanford-le-Hope; Maurice J. Cahalan, Pangbourne, both of England

[73] Assignee: RTL Contactor Holding S.A., Zug, Switzerland

[21] Appl. No.: 963,775

[22] Filed: Nov. 27, 1978

[30] Foreign Application Priority Data

Nov. 25, 1977 [GB] United Kingdom ............... 49178/77

[51] Int. Cl.³ ..................... C01G 43/00; C01B 25/01
[52] U.S. Cl. ........................................ 423/6; 423/7; 423/10; 423/319; 423/321 R
[58] Field of Search ............ 423/6, 7, 10, 319, 321 R, 423/321 S

[56] References Cited

U.S. PATENT DOCUMENTS 3,649,209  3/1972  Coleby .............................. 422/264
4,035,292  7/1977  Himsley ................................ 423/6

FOREIGN PATENT DOCUMENTS 2352062  1/1978  France .............................. 423/10

Primary Examiner—Brooks H. Hunt
Attorney, Agent, or Firm—Bernard, Rothwell & Brown

[57] ABSTRACT

The invention describes the extraction of values, especially metal values such as copper and uranium, from minerals by passing the mineral in admixture with a leaching agent for the values through a contactor and extracting the values with an extractant stream immiscible with the mixture and of lesser density so that the values are captured by the extractant and can be withdrawn with the extractant and, if desired, isolated by any suitable means.

19 Claims, 1 Drawing Figure

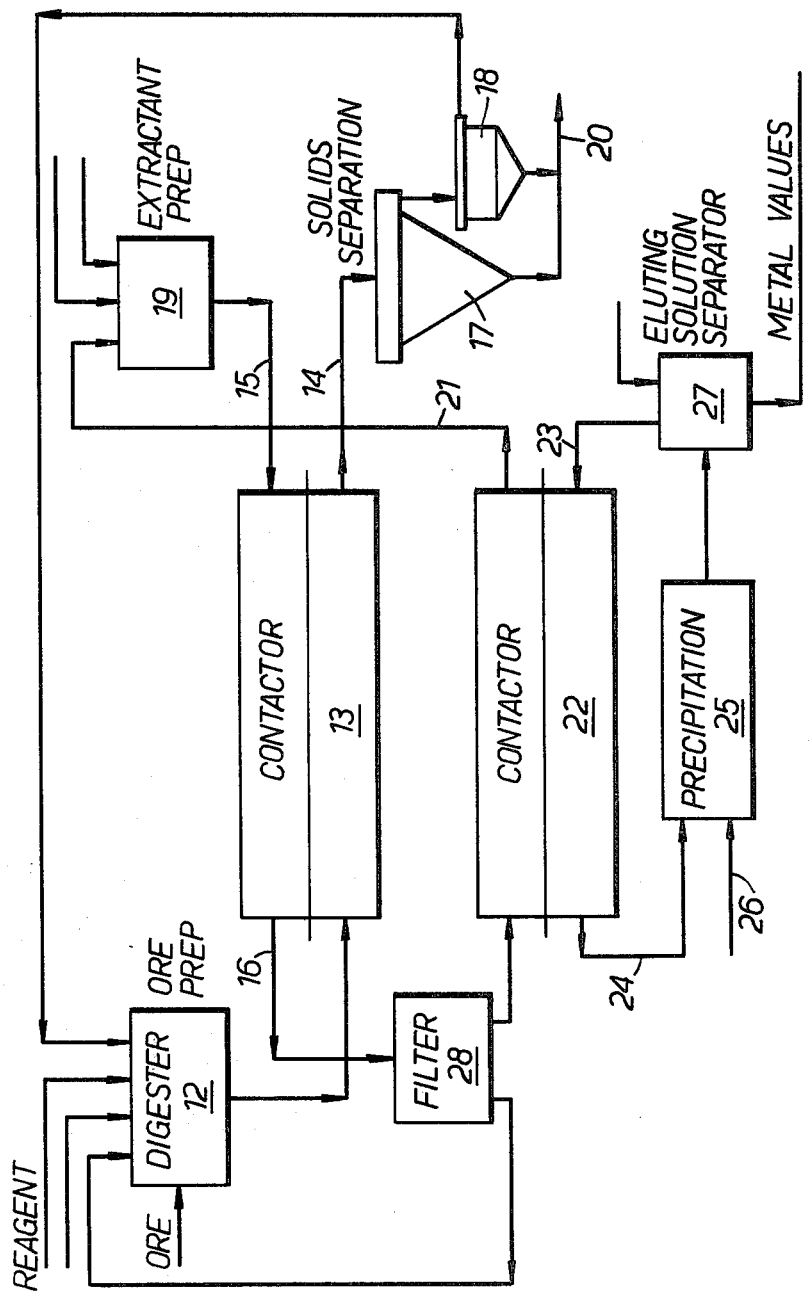

EXTRACTION PROCESS

BACKGROUND OF THE INVENTION

This invention relates to a continuous process for the extraction of metal and non-metal values from minerals and particularly, but not exclusively, metal values from metal ores and concentrates.

Extraction from ores and concentrates is usually performed by leaching with a reagent such as a mineral acid to convert the contained metal values to metal salts which are soluble in the reagent. After removal of the remaining insoluble solids of the ore or concentrate the metal values can then be extracted from the liquid phase.

It is known that the rate of reaction of the leaching process falls with increase in concentration of the reaction product—the metal salt—and that the reaction reaches equilibrium when a given concentration is achieved. It is therefore not usually possible to leach out all the contained metal values and it is necessary either to forego the extraction of the remaining metal or to treat the ore again after the reaction product so far generated has been removed. In either case, leaching efficiency is lost.

OBJECTS OF THE INVENTION

It is an object of the invention to provide a process, whereby the leached-out product is continuously removed during the leaching process. It is a further object of the invention to provide a process which can proceed without substantial fall in reaction rate until the greater proportion of the values initially contained in the metal-containing material has been leached out. These and other objects of the invention will appear from the following description and claims.

SUMMARY OF THE INVENTION

One aspect of the present invention resides in a process for extracting at least one metal or non-metal value from a mineral containing such a value or values, in which the mineral is caused to react with a liquid reagent to convert the value or values into an extractable form during passage of a mixture of the mineral and the reagent through a contactor, the mixture, during that passage, being repeatedly showered through a stream of an extractant for the value or values, that extractant being substantially immiscible with, and of lesser density than, the liquid reagent.

Although the invention has primary application to the extraction of metal values, non-metallic values can be extracted, such as phosphorus from phosphates, boron from borates, and sulphur from sulphides.

According to another aspect of the present invention, a process for extracting at least one metal value from a metal-containing mineral comprises: forming a slurry of the mineral and a liquid leaching reagent capable of acting on the metal value or values in the mineral to give a separable form of the value or values; passing the slurry through a contactor, in which the leaching reaction proceeds and in which the slurry is showered through a stream of an extractant for the metal value or values, the extractant being substantially immiscible with, and of lesser density than, the leaching reagent; and withdrawing separately from the contactor the extractant stream with captured metal value or values and a discharge stream of the reagent and residual solids.

BRIEF DESCRIPTION OF THE DRAWING

The drawing is a flow diagram of a process according to the invention suitable for the extraction of uranium from uranium ore concentrates.

DESCRIPTION OF THE PREFERRED EMBODIMENTS

The slurry and the extractant stream preferably pass through the contactor in countercurrent flow. Advantageously, there is a tendency within the contactor to form three separate phases—a lowermost phase consisting of the solids in contact with the leaching reagent, an intermediate phase predominantly of that reagent, and an uppermost phase of the extractant. The phases are continuously brought into contact with one another during their passage through the contactor, so that leaching takes place continuously and so that the extractant can efficiently remove the leached-out product from the leaching reagent. Thus the slurry stream and the extractant stream may pass through the contactor substantially horizontally, while receptacles within the contactor repeatedly lift the solids and allow them to fall through the contactor and repeatedly carry the extractant downwards to allow it to subsequently pass upwardly through the reagent phase, in which the leached-out product is contained.

The extractant stream leaving the contactor and containing the metal values may be stripped of metal values and recycled to the contactor. The stripping may take place continuously in a second contactor, which may or may not be similar to the first contactor, and in which the extractant stream and an eluting solution flow in countercurrent. The eluting stream discharged from the second contactor may then be treated to precipitate the metal values and may be recycled to the second contactor.

The process of the invention has particular application to the extraction of uranium and copper from ores and concentrates, but may be used also for the extraction of other metal values such as nickel, cobalt, vanadium, zinc, molybdenum, manganese, cadmium and tungsten. The leaching reagent used is dependent on the ore or concentrate to be treated, but, for uranium and copper, is preferably sulphuric acid having a concentration higher than 30%. In order to maintain a reasonably high rate of leaching reaction, the temperature of the materials within the contactor is maintained at an above-ambient temperature. The temperature is usually between 40° C. and 100° C. but may exceed 100° C. when the pressure within the contactor is superatmospheric.

The process is normally conducted at atmospheric pressure but may be at a high pressure if the process requires it for enhanced efficiency or other reason.

The extractant employed is also dependent on the metal to be extracted buy may conveniently be one of the following three types; (or a mixture thereof): an organic solvent for the metal values, or a liquid or particulate ion-exchange resin capable of capturing the metal values, or a chelating agent for the metal values. Thus the extractant may be an alkyl phosphoric acid derivative, an alkylamine, a hydroxy oxime, a cation exchange resin such as those containing carboxylic acid or sulphonic acid groups, or an anion exchange resin containing a weakly or strongly basic functional group, e.g. a tertiary amino group. Where the extractant is a chelating agent, the extractant stream may be the chelating agent carried in a carrier liquid e.g. kerosene, and, where the extractant is a light-weight particulate ion-exchange resin, the extractant stream consists of the particles carried in a carrier liquid, e.g. dilute sulphuric acid.

Further, the extractant may comprise two or more different constituents, which may be of the types specified above or may be of different types; more than one constituent may be employed for synergistic reasons or for the simultaneous extraction of more than one value.

The following description is given by way of illustration of the invention and is concerned with extraction of uranium from uranium ore concentrates, but the extraction of other suitable metals, and particularly those specified above, may be performed similarly with appropriate change of the various reagents.

The crushed and ground ore concentrate to be extracted, in an aqueous slurry form, is mixed with sulphuric acid as a leaching reagent at a temperature of about 50° C. to 60° C. in a digester 12 and then passed as a slurry to the bottom of one end of a multi-compartmental contactor 13 for example of the type described in U.S. Pat. No. 3,649,209. In each compartment of that contactor there are continuously rotating buckets which function to bring the phases within the contactor repeatedly in contact with one another. The slurry of ore solids and leaching reagent passes continuously through the contactor and is discharged at the other end on line 14.

An extractant steam is introduced on line 15 at the top of the contactor 13 and passes through the contactor in countercurrent to the slurry stream, before leaving through line 16. The extractant is a selective solvent for the metal values in the slurry and is shown as derived from an extractant preparation unit 19 to which one or more extractants are supplied.

The extractant is immiscible with the leaching reagent and has a density less than that of the leaching reagent. Accordingly the materials within the contactor tend to move through the contactor in three phases—a lowermost phase, consisting of the solids of the ore in contact with the leaching reagent, an intermediate phase of the leaching reagent, and an uppermost phase of the extractant. The rotating buckets repeatedly lift the solids, together with reagent, upwards through the contactor and release them to shower through the extractant and reagent phases. At the same time, extractant is carried down towards the bottom of the contactor and floats up through the reagent phase. In this manner the phases are brought into contact so promoting rapid reaction without vigorous agitation.

The temperature within the contactor is maintained at an optimum temperature, e.g. 50° to 60° C., for the leaching reaction between the ore concentrate and the sulphuric acid and, as the slurry moves through the contactor, that reaction takes place progressively to generate uranyl sulphate which becomes dissolved in the reagent phase. However, the repeated contacting of the reagent phase with the extractant causes the metal values to be extracted and removed from the leaching reagent as it is produced, so that the concentration of the leached-out product in contact with the leaching reagent and ore solids is maintained throughout the contactor at a low value. Consequently, the rate of the leaching reaction does not fall significantly and removal of the metal values initially in the ore is achieved more rapidly and effectively before the solids are discharged on line 14. Little of the extractant is lost with the leaching reagent.

The discharge stream on line 14, consisting predominantly of the remaining insoluble ore solids and sulphuric acid, is treated in a cone-type separator 17, in which the heavier particles settle; the liquid phase is then treated in a fines separator 18 and recycled to the digester 12 after adjusting the acid concentration as necessary. The separated solids with the fines from separator 18 are discharged on line 20.

The extractant stream with metal values discharged from the contactor on line 16 is treated for recovery of the metal values and then recycled on line 21 to the unit 19. Thus, the discharge extractant stream is shown as fed to a second contactor 22, which may be similar in construction to contactor 13, and through which the extractant stream flows in countercurrent with a stream of eluting solution introduced on inlet line 23; an eluting solution known for the purpose, and preferably a mineral acid and/or an acid salt, is used. The extractant stream stripped of the metal values is discharged from the contactor to recycle line 21, while the eluting stream is fed on line 24 to a precipitating vessel 25 supplied with ammonia on line 26. The metal values are precipitated from the eluting solution and are separated from that solution in separator 27, the eluting solution being returned to line 23 after appropriate adjustment of salt and/or acid concentration, and the metal-containing precipitate being removed for further treatment.

The extractant stream introduced into contactor 13 is an organic solvent for the uranium, or a chelating agent carried in kerosene, or an ion-exchange resin in the form of light-weight particles carried in a carrier liquid such as dilute sulphuric acid.

The extractant stream from contactor 13 may need treatment before its entry to contactor 22. Thus, where an ion-exchange resin carried in a carrier stream of sulphuric acid is used as the extractant, the stream on line 16 may be processed in 28 to remove the sulphuric acid by sieving and then washed with water.

We claim:

1. A process for extracting at least one metal or non-metal value from a mineral containing such a value or values, comprising:
    passing a mixture of the mineral and a liquid reagent through a contactor, whereby the mineral is caused to react with the reagent to convert the value or values into an extractable form; and
    repeatedly showering the mixture, during its passage through the contactor, through a stream of an extractant for the value or values, the extractant being substantially immiscible with the liquid reagent and the extractant and the mixture forming substantially separate phases, whereby portions of the mixture during the passage are repeatedly passed through the extractant stream and portions of the extractant are repeatedly passed through the mixture.

2. A process for extracting at least one metal value from a metal-containing mineral, comprising:
    forming a slurry of the mineral and a liquid leaching reagent capable of acting on the metal value or values in the mineral to give a separable form of the value or values;
    passing the slurry through a contactor in which the leaching reaction proceeds;
    showering the slurry, during its passage through the contactor, through a stream of an extractant for the contactor value or values, the extractant being substantially immiscible with the leaching reagent and the extractant and leaching reagent forming substantially separate phases, whereby portions of the slurry are repeatedly passed through the extractant during the passage and portions of the extractant are repeatedly passed through the slurry; and withdrawing separately from the contactor the extractant stream with captured metal value or values and discharge stream of the reagent and residual solids.

3. A process according to claim 2 wherein the metal value or values are selected from uranium, copper, nickel, cobalt, vanadium, zinc, molybdenum, manganese, cadmium and tungsten.

4. A process according to claim 3, wherein the mineral extracted is a uranium and/or copper-containing ore or concentrate and the metal value or values extracted are selected from uranium and copper.

5. A process according to claim 4 wherein the leaching reagent is sulphuric acid of greater than 30% concentration.

6. A process according to claim 4 wherein the temperature of the materials within the contactor is between 40° C. and 100° C.

7. A process according to claim 1 wherein the extractant stream comprises an organic solvent for the value or values, a liquid or particulate ion-exchange resin capable of capturing the value or values and/or a chelating agent for the value or values.

8. A process according to claim 7, wherein the extractant stream comprises an alkyl phosphoric acid derivative, an alkylamine or a hydroxy oxime.

9. A process according to claim 7, wherein the extractant comprises a cation exchange resin containing carboxylic acid or sulphonic acid groups or an anion exchange resin containing a tertiary amino group.

10. A process according to claim 1 wherein the mixture of mineral and liquid reagent and the extractant stream pass through the contactor in countercurrent.

11. A process according to claim 1 wherein the phases formed within the contactor are continuously brought into contact with one another, during their passage through the contactor by means of receptacles within the contactor to repeatedly lift the solids and allow them to fall through the contactor and repeatedly carry extractant downwards to allow it to subsequently pass upwardly.

12. A process according to claim 1, wherein the extractant stream containing captured values is withdrawn from the contactor, stripped of its values and recycled.

13. A process according to claim 2 wherein the mixture of mineral and liquid reagent and the extractant stream pass through the contactor in countercurrent.

14. A process according to claim 2 wherein the phases formed within the contactor are continuously brought into contact with one another, during their passage through the contactor by means of receptacles within the contactor to repeatedly lift the solids and allow them to fall through the contactor and repeatedly carry extractant downwards to allow it to subsequently pass upwardly.

15. A process for extracting uranium from a uranium ore concentrate, comprising forming a slurry of the uranium ore concentrate and sulphuric acid as leaching agent;

passing the slurry through a contactor in which the leaching reaction proceeds;

showering the slurry, during its passage through the contactor, through a stream of an extractant for the uranium value selected from an organic solvent for the uranium, a chelating agent carried in kerosene and an ion exchange resin in the form of lightweight particles carried in a carrier liquid whereby portions of the slurry are repeatedly passed through the extractant during the passage and portions of the extractant are repeatedly passed through the slurry;

withdrawing separately from the contactor the extractant stream with the captured uranium value and a discharge stream of the sulphuric acid and residual concentrate; and recovering the uranium from the extractant stream and recycling the extractant to the contactor.

16. A process according to claim 15 wherein the phases formed within the contactor are continuously brought into contact with one another, during their passage through the contactor by means of receptacles within the contactor to repeatedly lift the solids and allow them to fall through the contactor and repeatedly carry extractant downwards to allow it to subsequently pass upwardly.

17. Metal or non-metal values when extracted from a mineral by the process of claim 1.

18. Metal values when extracted from a mineral by the process of claim 2.

19. Uranium when extracted from a uranium ore concentrate by the process of claim 15.

* * * * *